United States Patent [19]

Pearson

[11] 4,045,377

[45] Aug. 30, 1977

[54] CATIONIC POLYMER PREPARED FROM DICYANDIAMIDE, A POLYAMIDE, A DIALKYLAMINE, AND AN EPOXIDE

[75] Inventor: Stephen C. Pearson, Wilmington, Del.

[73] Assignee: Hercules Incorporated, Wilmington, Del.

[21] Appl. No.: 624,212

[22] Filed: Oct. 20, 1975

[51] Int. Cl.² .......................... B01D 21/01; C02B 1/20; C08G 73/02; C08G 59/18
[52] U.S. Cl. .................................. 260/2 BP; 210/54; 260/29.2 EP; 260/29.2 N
[58] Field of Search ...................... 260/2 BP, 29.2 EP

[56] References Cited

U.S. PATENT DOCUMENTS

| | | | |
|---|---|---|---|
| 3,403,113 | 9/1968 | Diethelm et al. | 260/2 BP |
| 3,738,945 | 6/1973 | Panzer et al. | 260/2 BP |
| 3,954,680 | 5/1976 | Jansma | 260/2 BP |

*Primary Examiner*—Murray Tillman
*Assistant Examiner*—Arthur H. Koeckert
*Attorney, Agent, or Firm*—Michael B. Keehan

[57] ABSTRACT

Cationic polymers which are useful as flocculants are prepared by reacting (a) a condensation polymer prepared from dicyandiamide and a polyalkylenepolyamine, (b) a dialkylamine, and (c) a difunctional epoxide.

12 Claims, No Drawings

CATIONIC POLYMER PREPARED FROM DICYANDIAMIDE, A POLYAMIDE, A DIALKYLAMINE, AND AN EPOXIDE

This invention relates to a new cationic polymer having quaternary ammonium functionality derived from reaction of a condensation polymer with a dialkylamine and difunctional epoxide. The condensation polymer employed in preparation of the cationic polymer of this invention is the reaction product of dicyandiamide and a polyalkylenepolyamine.

The new cationic polymer of this invention is prepared by a process comprising reacting dicyandiamide with a polyalkylenepolyamine to form a condensation polymer, mixing the condensation polymer with water to form an aqueous solution thereof, and then adding a dialkylamine and then a difunctional epoxide to the aqueous solution of condensation polymer and reacting this mixture to form the cationic polymer of this invention. The reaction of the condensation polymer, dialkylamine and difunctional epoxide is controlled to produce a cationic polymer having viscosity of from about 40 centipoises to about 250 centipoises measured in water as a 40% solution at 25° C. using a Brookfield viscometer.

The cationic polymer of this invention is an excellent flocculant. While not bound by any theory, it is understood that the effectiveness of cationic polymers containing quaternary ammonium groups as flocculating agents depends upon the proportion of the quaternary ammonium groups along the polymer backbone. The condensation polymer employed in preparation of the cationic polymer of this invention permits a high concentration of quaternary ammonium sites in the final cationic polymer.

The condensation polymer is of critical importance in preparation of the cationic polymer of this invention. The use of dicyandiamide in preparation of the condensation polymer with polyalkylenepolyamine is critical in preparation of the condensation polymer.

Polyalkylenepolyamines which can be reactd with dicyandiamide to provide a condensation polymer which is employed in preparation of the cationic polymer of this invention are materials represented by formula (I) below:

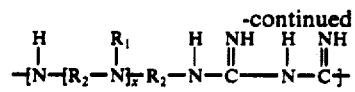

(I)

where in $R_1$ is hydrogen, $C_1$-$C_4$ alkyl, or $C_1$-$C_4$ hydroxyalkyl; $R_2$ is independent of the other $R_2$ an alkylene of from 2-6 carbon atoms; and x is an integer 1 through 5. Specific examples of polyalkylenepolyamines of the above formula (I) that can be employed include diethylenetriamine, triethylenetetramine, tetraethylenepentamine, dipropylenetriamine, dihexamethylenetriamine, pentaethylenehexamine, mixtures thereof, and the like.

The reaction of dicyandiamide with polyalkylenepolyamine is represented by the chemical equation set forth below:

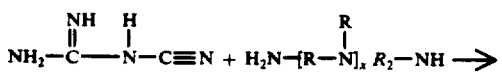

(II)

-continued

In the above equation formula (II) represents the repeating unit of the resulting condensation polymer and $R_1$ and $R_2$ are as defined for formula (I) above.

Dialkylamines employed in preparing the cationic polymers of this invention are secondary amines having the structural formula (III):

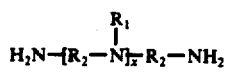

(III)

wherein $R_3$ is independent of the other $R_3$, a $C_1$-$C_3$ alkyl. Specific examples of dialkylamines of formula (III) are dimethylamine, diethylamine, methylethylamine, mixtures thereof, and the like.

Difunctional epoxy compounds which can be employed include epihalohydrins such as epichlorohydrin, epibromohydrin, epifluorohydrin, epiiodiohydrin, and longer chain epihalohydrins. Epichlorohydrin is preferred. Aliphatic diepoxides can also be employed such as diglycidyl ether, diglycidyl ether of 1, 3-butanediol; 1, 2, 5, 6-diepoxyhexane; and the like. Mixtures of difunctional epoxy compounds can be employed if desired.

In preparation of the cationic polymer of this invention, a condensation polymer as heretofore generally described is first prepared. In preparation of the condensation polymer, dicyandiamide is initially admixed with polyalkylenepolyamine. The mixture is heated to about 120° C. at which temperature reaction begins to take place. The reaction is exothermic. Reaction temperature is then controlled at between about 130° C. and 170° C. with the preferred reaction temperature range being from about 150° C. to about 170° C. During the course of the reaction ammonia is evolved. When ammonia ceases to be evolved, the reaction is substantially complete. The mole ratio of polyalkylenepolyamine to dicyandiamide employed is preparation of the condensate polymer is from about 1.2/1 to about 1/1.2. Preferably a molar excess of polyalkylenepolyamine is employed at a level of about 10% molar excess.

Water is added to the condensation polymer to prepare an aqueous solution thereof prior to reaction with dialkylamine and epichlorohydrin. Water is added after the condensation reaction is complete to dissolve the polymer formed. The amount of water added to the condensation polymer should be sufficient to dissolve a substantial portion of the condensation polymer, i.e., to form a solution of polymer containing no more than about 50% total solids. Water is a necessary diluent for the reaction of condensation polymer, difunctional epoxide and dialkylamine in order to control the reaction to produce a water-soluble cationic polymer of this invention.

As a second step in preparation of the cationic polymer of this invention, condensation polymer in aqueous solution is admixed with dialkylamine and difunctional epoxide. It is preferable to add the difunctional epoxide to a mixture of dialkylamine and condensate polymer when preparing the cationic polymer of this invention. The mole ratio of condensation polymer to dialkylamine will vary depending upon the molecular weight of the condensation polymer. In general, the ratio of dialkylamine (moles) to the equivalent molecular weight of the polymeric repeating unit of the condensation polymer is from about 20/1 to about 2/1 and is preferably from about 8/1 to about 3/1. The difunctional epoxide is employed in this reaction mixture in a mole ratio of about 1 to about 2 moles of difunctional epoxide per mole of dialkylamine reactant and preferably at a mole ratio of at least 1.05 moles difunctional epoxide per mole of dialkylamine.

In preparation of the cationic polymer of this invention the difunctional epoxide functions to combine the mixture of reactants comprising condensation polymer, dialkylamine, and difunctional epoxide. The reaction is exothermic and is preferably controlled within a temperature range of from about 50° C. to about 80° C. Reaction is continued until the viscosity of the resultant cationic polymer is between about 40 centipoises and 250 centipoises and preferably from about 40 centipoises to about 80 centipoises when measured in water as a 40% by weight solution at 25° C. Viscosity is measured using a Brookfield Model LVF Viscometer.

The viscosity of the cationic polymer of this invention is controlled by stabilizing unreacted difunctional epoxide in the reaction mixture such that the viscosity of the resulting cationic polymer is maintained between about 40 centipoises and about 250 centipoises. To achieve this result the viscosity of the reaction mixture is constantly monitored during the course of the reaction by any suitable means such as described in the examples which follow. Stabilization of the difunctional epoxide to further reaction can be achieved by any suitable means such as by adding water and by adjusting the pH of the reaction mixture with a suitable acid to a pH value of from about 4 to about 6 or by addition of water and secondary amine and reacting said secondary amine with the difunctional epoxide thereby terminating further reaction of difunctional epoxide with condensation polymer and dialkylamine.

The following examples more fully illustrate this invention. In the examples, parts and percentages are by weight unless otherwise specified. In the examples, final viscosity measurements are made using a 40% by weight solution of polymer at 25° C., using a Brookfield Viscometer, Model LVF.

Example 1

To a one liter reaction vessel was added 159 grams of dicyandiamide (1.90 moles) and 206 grams of diethylenetriamine (2.0 moles). The mixture was heated to 120° C at which temperature an exothermic reaction was initiated. Ammonia was evolved as a product of the reaction and the reaction mixture temperature increased to about 140° C. When the exothermic reaction ceased the temperature of the reaction mass was raised to 170° C. and held at that temperature for 90 minutes to ensure that the reaction was complete. There was no evidence of any evolution of ammonia during the heating of the reaction mass at 170° C. About 755 grams of water was slowly added to the reaction mass under refluxing conditions until the temperture of the reaction mass was reduced to 100° C. The resulting mixture was cooled and the product was an aqueous solution of condensation polymer containing some suspended solids and having a 33% total solids content.

The following example illustrates preparation of the cationic polymer of this invention utilizing the condensation polymer prepared in Example 1 as a reactant.

Example 2

A mixture comprising 100 grams of a 33% by weight solution of the condensation polymer of Example 1 (0.2 equivalent) and 90 grams of a 40 weight percent solution of dimethylamine (0.8 mole) was added to a reaction vessel. To this mixture 92.5 grams of epichlorohydrin (1 mole) is added over a 15 minute time period while the temperature of the mixture is held at 50° C. The reaction vessel is then heated to 60° C. and the viscosity of the reaction mass is monitored continuously by periodically taking samples of the reaction mass and by measuring the time taken for a 5 cc. sample to fall through a 2 millimeter capillary, 2 inches long. As the viscosity of the reaction mass increased, water was added to the reaction mass to retard gelation, until after 4 hours of reaction at 60° C. a total of 100 grams of water had been added. The pH of the reaction mass was lowered to 5.5 by addition of formic acid. The resulting cationic polymer was an amber, mobile liquid containing 34.3% solids which had a viscosity of 180 centipoises.

Example 3

A 1000 cc. reaction vessel was fitted with a reflux condenser, stirrer, thermometer and an addition funnel. A mixture comprising 112.5 grams of a 40% by weight aqueous solution of dimethylamine (1 mole) and 73.6 grams of a 33.4% by weight aqueous solution of condensation polymer prepared in accordance with Example 1 (0.15 equivalents based on the calculated molecular weight of the repeating unit of the condensation polymer) was added to the reaction vessel. To this mixture 110.8 grams of epichlorohydrin (1.10 moles) was added over a 50 minute time period while the temperature of the mixture was held at 50° C. After addition of the epichlorohydrin was complete the reaction vessel was heated to 75° C. and this temperature was maintained for 2 hours and 45 minutes. The viscosity of the resulting reaction mass was monitored continuously by periodically taking samples of the reaction mass and determining the viscosity of the mixture on the Gardner-Holdt scale. When the viscosity of the reaction mixture increased as measured by Gardner-Holdt to T-U on the Gardner-Holdt scale, 140 g. of water and 5 milliliters of morpholine were added to the reaction mixture. The mixture was heated at 45° C. for 2 hours, at which time there was no further change in the viscosity of the reaction mixture indicating that reaction between morpholine and epicholorohydrin was complete. The stabilized reaction product (the cationic polymer of this invention ) contained 42.5% total solids. The reaction product was a yellow liquid which had a viscosity of 40 centipoises.

In order to demonstrate the improved flocculation efficiency of the cationic polymer of this invention, comparison of flocculating efficiency is made between the cationic polymer of this invention and certain cationic polymers prepared in accordance with the teaching of U.S. Pat. No 3,738,945, which patent represents relevant prior art to the cationic polymer of this invention.

Example 4

A 500 ml. reaction vessel was equipped with condenser, mechanical stirrer, thermometer, and addition funnel. To the reaction vessel a charge of 92.5 grams of epichlorohydrin (1 mole) was added. To the epichlorohydrin, 112 grams of dimethylamine (1 mole) was added dropwise as a 40% aqueous solution over a period of one hour, and the temperature of the reaction mixture was maintained at between 20° and 33° C. The reaction mixture was continuously stirred during the addition. The resulting solution was then heated to 50° C. and held at the temperature for 6 hours. The product was then diluted to 37% solids with water and the viscosity was determined to be 19 centipoises. This experiment was repeated in an effort to prepare a polymer having a viscosity as disclosed in Example 1 of U. S. Pat. No. 3,738,945, but without success.

The following example illustrates the preparation of a polymer of the prior art, following the process described in Example 11 of U.S. Pat. No. 3,738,945. The quantities of reactants utilized in preparation of this polymer are not identical with those set forth in Example 11 of U.S. Pat. No. 3,738,945. When precisely following this example, the rate of viscosity build-up of the polymer could not be adequately controlled. In the example which follows, the mole ratios of reactants approached the mole ratios of reactants employed in Example 11 of the U.S. Pat. No. 3,738,945 patent, and the process for preparation of the polymer was modified slightly as is set forth in Example 5.

Example 5

A condensation polymer is prepared by reacting a mixture comprising 316 grams of adipic acid (2.15 moles) and 320 grams of triethylenetetramine (2.23 moles) by heating said mixture at 170° C. for 2 hours. To the resulting condensation polymer, water was added to produce a 37% by weight solution.

A mixture was then prepared of 81 grams of a 40% aqueous solution of dimethylamine (0.17 mole DMA) and 426 grams of the condensation polymer. The temperature of the mixture was maintained at 30°-35° C. while 55.8 grams of epichlorohydrin was added thereto over a period of 3 hours. After all the epichlorohydrin was added, the viscosity of the reaction mass was monitored by taking samples of the reaction mass and measuring the time required for 5 ml of the reaction mass to fall through 2 millimeter capillary, 2 inches long. Thirty minutes after completion of the addition of the epicholorhydrin the time required for 5 milliliters of reaction mass to fall through the capillary increased from 38 seconds to 132 seconds and the vortex was lost indicating that gelation of the reaction mass was imminent. About 150 grams of water was added to the reaction mass and the pH of the diluted reaction mass was reduced to 4 by addition of sulfuric acid. The resulting stabilized cationic polymer was a red liquid containing 35% and having a viscosity of 415 centipoises.

The following example illustrates another preparation of the cationic polymer of this invention.

Example 6

A large reactor was charged with 4299 parts of a 40% aqueous solution of dimethylamine and 975 parts of a 30% aqueous solution of a condensation polymer dicyandiamide and diethylenetriamine. The condensation polymer was prepared by reacting a mixture of 550 parts of diethylenetriamine and 45 parts of dicyandiamide by heating the mixture at a temperature of 170° C. for 2 hours. To this mixture was added 4419 parts of epichlorohydrin at a rate of 25-30 parts per minute. The reaction temperature was controlled to a temperature below 60° C. by cooling. After all the epichlorohydrin had been added to the reactor the reaction mass was held at a temperature of 55°-60° C. and the viscosity of the resulting cationic polymer formed increased as measured by Gardner-Holdt tubes from D to V on the Gardner-Holt scale. Sufficient water was added to the cationic polymer when the viscosity reached V on the Gardner-Holdt scale to form an aqueous solution of cationic polymer comprising 40% by weight solids. To stabilize the cationic polymer, 285 parts morpholine and 187 parts formic acid were added to the aqueous mixture of cationic polymer. The resulting cationic polymer had a viscosity of 40 centipoises.

Examples 7-14

To compare the efficiency of a cationic polymer of this invention as prepared in Example 6 with polymers of the prior art prepared in accordance with Examples 4 and 5, a synthetic river water was treated with varying dosages of these polymers. The synthetic river water was prepared from fresh water to which was added 250 milligrams per liter of black liquor (hardwood kraft) and 100 milligrams per liter of bentonite (<200 mesh). In comparing the effectiveness of these polymers as flocculants the polymers were added to the synthetic river water in the amounts specified in Table 1 and residual turbidity was determined. In conducting the residual turbidity tests one liter samples of synthetic river water were placed in jars of a gang stirrer and each sample was mixed at 80 r.p.m. for one minute. Polymer was added to the samples of synthetic river water and mixed at 80 r.p.m. for 30 seconds, at 40 r.p.m. for 90 seconds, and at 20 r.p.m. for 3 minutes. Stirring was then stopped and the flocculated solids were allowed to settle for 10 minutes. A sample of the supernatant liquid was removed from each sample and its turbidity was measured. The turbidity for the samples is set forth in Table 1 and is expressed as Jackson Turbidity Units (JTU). The Jackson Turbidity Units were measured using a Hach model 2100 spectrophotometer utilizing turbidity standards prepared from a polystyrene latex. Results of these tests are set forth in Table 1.

TABLE 1

| Turbidity of Synthetic River Water After Treatment with Cationic Polymwers | | | | | | | |
|---|---|---|---|---|---|---|---|
| Example No. | | | | | | | |
| | 7 | 8 | 9 | 10 | 11 | 12 | 13 | 14 |
| Polymer Dosage (mg/L) | 2.5 | 5.0 | 7.5 | 10.0 | 12.5 | 15.0 | 17.5 | 20.0 |
| | Residual Turbidity (JTU)[1] | | | | | | | |
| Polymer of Invention, Example 6 | 75 | 25 | 11 | 11 | 9 | 10 | 15 | 51 |
| Polymer of Example 4 | 83 | 31 | 25 | 22 | 17 | 17 | 13 | 13 |
| Polymer of Example 5 | 70 | 66 | 50 | 41 | 22 | 22 | 20 | 20 |

[1] JTU - Jackson Turbidity Units, a photometric determination based on polystyrene standards.
See: Standard Methods for the Examination of Water and Wastewater, Twelfth Edition (1965), page 312.

The data set forth in Table 1 show that the polymer of this invention outperforms the polymers of Examples 4 and 5 (prior art) in that peak performance is better and was reached at lower dosages utilizing the polymer of this invention.

Examples 15-29

Following the procedure of Examples 1 and 2, polymers prepared from the ingredients specified in Table 2 and designated as Examples 15, 16 and 17 were prepared. Also following the procedure of Examples 1 and 2, with the exception of substitution of adipic acid for dicyandiamide, the polymers of Examples 18, 19 and 20 were prepared. The polymers of Examples 15, 16 and 17 are cationic polymers of this invention and the polymers of Examples 18, 19 and 20 are cationic polymers in which the condensate polymer reactant utilized in preparation of these cationic polymers is a condensate polymer disclosed in U.S. Pat. No 3,738,945. Results utilization of these cationic polymers in flocculation of synthetic river water (Examples 21-29) prepared from fresh water to which is added 140 milligrams per liter of black liquor (softwood) and 50 milligrams per liter of bentonite clay (<200 mesh), are set forth in Table 3. The procedures employed in conducting these turbidity tests are the same as described for Examples 7-14.

TABLE 2

| Reactants | Example No. | | | | | |
|---|---|---|---|---|---|---|
| | 15 | 16 | 17 | 18 | 19 | 20 |
| Dimethylamine (Moles) | 0.8 | 0.6 | 0.4 | 0.8 | 0.6 | 0.4 |
| Condensate Polymer A[1] (Moles) | 0.2 | 0.4 | 0.6 | — | — | — |
| Condensate Polymer B[2] | — | — | — | 0.2 | 0.4 | 0.6 |
| Moles (Total) | 1.0 | 1.0 | 1.0 | 1.0 | 1.0 | 1.0 |
| Polymer Viscosity (centipoise) | 180 | 140 | 180 | 180 | 220 | 240 |

[1]Condensate polymer of diethylenetriamine and dicyandiamide.
[2]Condensate polymer of diethylenetriamine and adipic acid.

TABLE 3

| | Flocculation of Synthetic River Water | | | | | | | | |
|---|---|---|---|---|---|---|---|---|---|
| | Example No. | | | | | | | | |
| | 21 | 22 | 23 | 24 | 25 | 26 | 26 | 28 | 29 |
| Polymer Dosage (mg/L) | 0 | 1.25 | 2.5 | 3.75 | 5 | 6.25 | 7.5 | 8.75 | 10 |
| | Residual Turbidity (JTU)[1] | | | | | | | | |
| Polymer of Example 15 | 72 | 72 | 60 | 16 | 16 | 70 | — | — | — |
| Polymer of Example 18 (Prior Art) | 72 | 72 | 72 | 27 | 20 | 20 | 20 | 21 | 29 |
| Polymer of Example 16 | 75 | 75 | 68 | 18 | 18 | 23 | 75 | — | — |
| Polymer of Example 19 (Prior Art) | 75 | 75 | 75 | 75 | 38 | 25 | 28 | 45 | 75 |
| Polymer of Example 17 | 69 | 69 | 68 | 18 | 14 | 17 | 70 | — | — |
| Polymer of Example 20 (Prior Art) | 69 | 69 | 69 | 66 | 65 | 67 | 75 | — | — |

[1]JTU — Jackson Turbidity Units

Review of the data in Table 3 shows the cationic polymer of this invention was more effective than prior art polymer in reducing turbidity of the synthetic river water.

The cationic polymer of this invention has been found to be more effective than similar prior art polymers and to be less sensitive to changes in the levels of turbidity in the system being treated as well as less sensitive to the types of solids suspended in said systems of the flow rate thereof.

The cationic polymer of this invention cannot be identified by a structural formula. It is a complex mixture of crosslinked cationic polymers having numerous quaternary ammonium groups throughout the polymer structure and it may contain small amounts of unreacted ingredients and side reaction products. Therefore, the cationic polymer of this invention is defined by its process of manufacture.

What I claim and desire to protect by Letters Patent is:

1. A process for the preparation of a water-soluble cationic polymer comprising:
   a. reacting and polyalkylenepolyamine having the formula

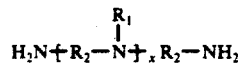

wherein $R_1$ is hydrogen, $C_1-C_4$ alkyl, $C_1-C_4$ hydroxyalkyl; $R_2$ is independent of the other $R_2$ and is an alkylene radical having from 2 to 6 carbon atoms and x is an integer of 1 to 5 and dicyandiamide in a mole ratio of polyalkylenepolyamine to dicyandiamide of from about 1.2/1 to about 1/1.2 until reaction is substantially complete whereby a condensation polymer is produced,
   b. forming an aqueous solution of the condensation polymer of step (a),
   c. admixing dialkylamine having the formula

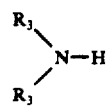

wherein $R_3$ is independent of the other $R_3$ and is a $C_1-C_3$ alkly, and the aqueous solution of condensate polymer of step (b) in a mole ratio of dialkylamine to the equivalent molecular weight of the repeating unit of the condensation polymer of from about 20/1 to about 2/1,
   d. admixing the mixture of step (c) with difunctional epoxide, the mole ratio of difunctional epoxide to dialkylamine being from about 2/1 to about 1/1,
   e. reacting the resulting admixture at a temperature of from about 50° C. to about 80° C., said reaction being continued until the viscosity of the resultant cationic polymer is in the range of from about 40 centipoises to about 250 centipoises, viscosity of the cationic polymer being measured in water as a 40% by weight solution at 25° C., and
   f. terminating the reaction of step (e).

2. The process of claim 1 in which the polyalkylenepolyamine is diethylenetriamine and the dialkylamine is dimethylamine.

3. The process of claim 2 in which the difunctional epoxide is epichlorohydrin.

4. The process of claim 1 in which the mole ratio of dialkylamine to the equivalent molecular weight of the repeating unit of the condensate polymer is from about 8/1 to about 3/1.

5. The process of claim 4 in which the mole ratio of polyalkylenepolyamine to dicyandiamide is about 1.1/1.

6. The process of claim 1 in which the difunctional epoxide is an epihalohydrin.

7. The process of claim 6 in which polyalkylenepolyamine and dicyandiamide are reacted at a temperature of from about 120° C. to about 170° C.

8. The process of claim 7 in which the difunctional epoxide is selected from the group consisting of epichlorohydrin, epibromohydrin, epiiodohydrin and epifluorohydrin.

9. The process of claim 8 in which the polyalkylenepolyamine is selected from the group consisting of diethylenetriamine, triethylenetetriamine, tetraethylenepentamine, dipropylenetriamine, dihexamethylenetriamine, pentaethylenehexamine, and mixtures thereof.

10. The process of claim 9 in which the dialkylamine is selected from the group consisting of dimethylamine, diethylamine, methylethylamine and mixtures thereof.

11. The water-soluble cationic polymer prepared in accordance with the process of claim 1.

12. The water-soluble cationic polymer prepared in accordance with the process of claim 3.